A. J. BRADLEY.
STENCIL CHARACTER PUNCH AND PROCESS OF MAKING SAME.
APPLICATION FILED JAN. 10, 1921.
1,378,520. Patented May 17, 1921.
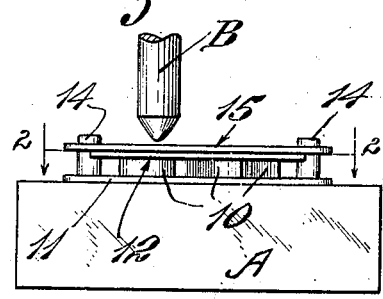
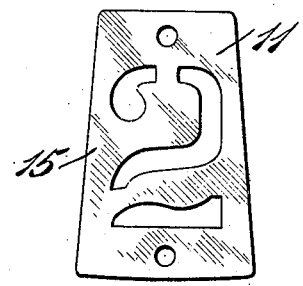
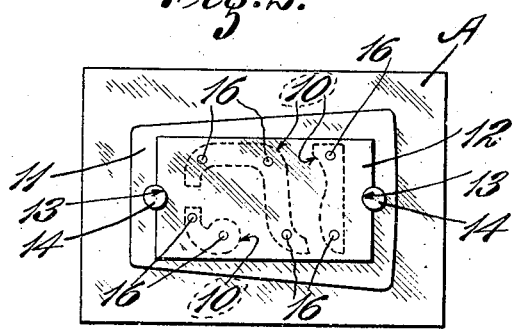
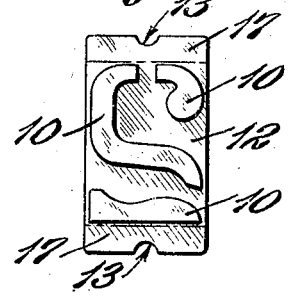
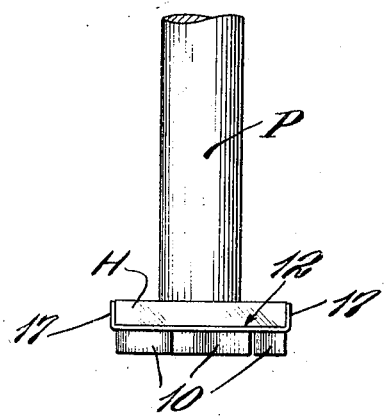
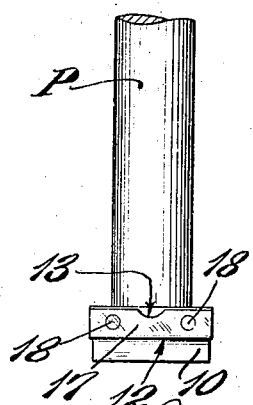
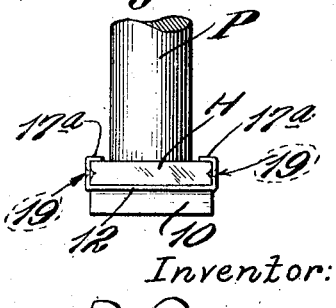
Inventor:
Andrew J. Bradley
by Carr & Carr
his Attorneys.

UNITED STATES PATENT OFFICE.

ANDREW J. BRADLEY, OF NEW YORK, N. Y.

STENCIL-CHARACTER PUNCH AND PROCESS OF MAKING SAME.

1,378,520.      Specification of Letters Patent.      Patented May 17, 1921.

Application filed January 10, 1921. Serial No. 436,127.

*To all whom it may concern:*

Be it known that I, ANDREW J. BRADLEY, a citizen of the United States, and a resident of the city of New York and State of New York, have invented a new and useful Improvement in Stencil - Character Punches and Processes of Making Same, of which the following is a specification.

Punches of stencil cutting machines comprise a shank portion terminating in a block or base on the face of which are mounted the cutting members that go to make up the particular stencil character. Usually, these members are the punchings made in a thick sheet by a master punch of the proper design, said punchings being afterward brazed or soldered to the base plate while held in proper relation to each other by means of a suitable templet. This operation is slow and expensive; and some of the punches so produced are short-lived on account of the failure of the solder in use; and on account of it being impracticable to replace a lost cutting member.

The present invention relates to the manufacture of stencil character punches and has for its principal object to devise a quick, reliable and economical process of mounting the cutting members on the base of the punch, and to provide for repair of punches and for replacement of the face portions thereof. It consists principally in the process of welding and mounting the cutting members hereinafter described; and it also consists in the process of spot welding the cutting members to a comparatively thin sheet of metal and afterward mounting said sheet on the base of the punch; and it also consists in the punch hereinafter described and claimed; and it also consists in the details hereinafter set forth.

In the accompanying drawings wherein like reference numbers refer to like parts wherever they occur, Figure 1 is a side elevation of the small and large electrodes of an electric spot welding machine, showing the parts assembled on the large electrode in conformity to my invention;

Fig. 2 is a horizontal section taken on the line 2—2 in Fig. 1;

Fig. 3 is a face view of one of the two plates, which serves as a positioning plate for the punchings and the other of which serves as a guiding plate for the small electrode;

Fig. 4 is a face view of the welding strip with the punchings welded thereto;

Fig. 5 is a side view, showing the welding strip with its marginal portion turned up and welded to the base portion of the punch;

Fig. 6 is an end view of the parts shown in Fig. 5; and

Fig. 7 is a view similar to Fig. 5, showing the welding strip detachably secured to the base portion of the punch.

In carrying out my present process, a master punch of proper design to form a stencil character is used to punch a sheet or plate of metal of suitable thickness (say about one-eighth of an inch thick) as in the old process of making stencil character punches. The punchings 10 are mounted in a suitable templet 11, such as a plate cut by means of the master punch, and laid flatwise against the large electrode A of an ordinary spot welding machine, the face in contact with such large electrode being the one struck by the master punch. A thin sheet of metal 12, such as No. 20 gage soft steel is laid on top of the punchings 10. The thin plate 12 is formed with notches 13 in its opposite ends, which notches embrace pins 14 that project upwardly from the large electrode A, thereby suitably centering or positioning said plate with reference to the punchings 10. As the punchings 10, that are to form the cutting members of the punch P, are concealed from the operator by the thin plate 12, an indicator plate 15, preferably a counterpart of the templet 11 in which the punchings are positioned, is located above the thin plate and in register with the templet. By the use of this guiding plate 15, the operator is enabled to direct the small electrode B as accurately as if the punchings were visible. While the parts are in the relation described, the small electrode B is pressed against the thin plate 12 at the required points 16 in rapid succession, these points being directly above the punchings, as determined by the indicator. Effective welds are thus made between the punchings 10 and the thin plate 12 in accordance with the art of electric spot welding.

The thin plate 12 to which the punchings 10 are welded is longer (or wider) than the base or head H of the punch P on which it is to be mounted; and the end (or side) margins 17 thereof are flanged or bent up, leaving a flat space between said flanges of the same dimension as the length (or width) of the base of the punch. The welding plate 12, with the punchings 10 welded thereto, is then positioned on the base H of the punch P with its flanges 17 overlapping the ends (or sides) thereof and the flanges 17 are then preferably spot welded, as at 18, or otherwise suitably fastened to said punch. The cutting members are then finished in any suitable way.

The resulting product is a stencil character punch whose cutting members 10 are welded to the welding strip or plate 12 which in turn is secured to the base H of the punch P. As the cutting members are secured by welding, they are less liable to be dislodged than is the case with the ordinary type of stencil character punch. In case of breakage or damage to the cutting portion of the punch, the welding strip 12 can be removed and replaced with another, thus saving the shank and base portion of the punch which have heretofore been usually discarded in such cases. For certain classes of work, it may be desirable to mount the welding strips detachably with a view to quick replacement; and Fig. 7 illustrates a construction of this kind wherein the opposite side marginal portions 17ª of the welding strip 12 are flanged up and bent inwardly over the upper surface of the base portion H of the punch. The welding strip shown in Fig. 7 is adapted to be slipped over the head of the punch and is preferably held against sliding movement with respect thereto by center punching the flanges 17ª, as indicated at 19.

It is a great advantage of the above process that it permits the economical use of an ordinary electric spot welding machine; but it is important to note in this connection that the cutting edges of the punchings shall not be exposed to the action of the small electrode, as the concentration of the current and the pressure of said electrode on said punchings are very liable to produce a worthless article.

What I claim is:

1. The process of making stencil character punches which comprises welding of the cutting members to a thin welding strip and mounting said strip on a suitable base.

2. The process of making stencil charater punches which consists in punching a sheet of metal with a master punch, mounting the punchings in a templet and spot welding said punchings to a thin welding strip with the small electrode in contact with the thin welding strip, and mounting said welding strip on a suitable base.

3. The process of making stencil character punches which consists in punching a sheet of metal with a master punch, mounting the punchings in a templet, covering said punchings with a thin welding strip, applying above said welding strip an indicator corresponding to said templet and spot welding said punchings to said welding strip with the small electrode in contact with the welding strip, and mounting said welding strip on a suitable base.

4. A stencil punch comprising a base portion and a face portion mounted thereon, said face portion comprising a thin strip having the cutting members welded thereto.

5. A stencil punch comprising a base portion and a face portion detachably mounted thereon, said face portion comprising a thin strip having the cutting members welded thereto.

6. A stencil punch comprising a base portion and a face portion mounted thereon, said face portion comprising a thin strip having the cutting members welded thereto and having marginal portions welded to said base portion.

Signed at St. Louis, Missouri, this 8th day of January, 1921.

ANDREW J. BRADLEY.